June 25, 1940.  G. D. STEWART  2,205,605
ENGINE COOLING DEVICE
Filed Nov. 20, 1939
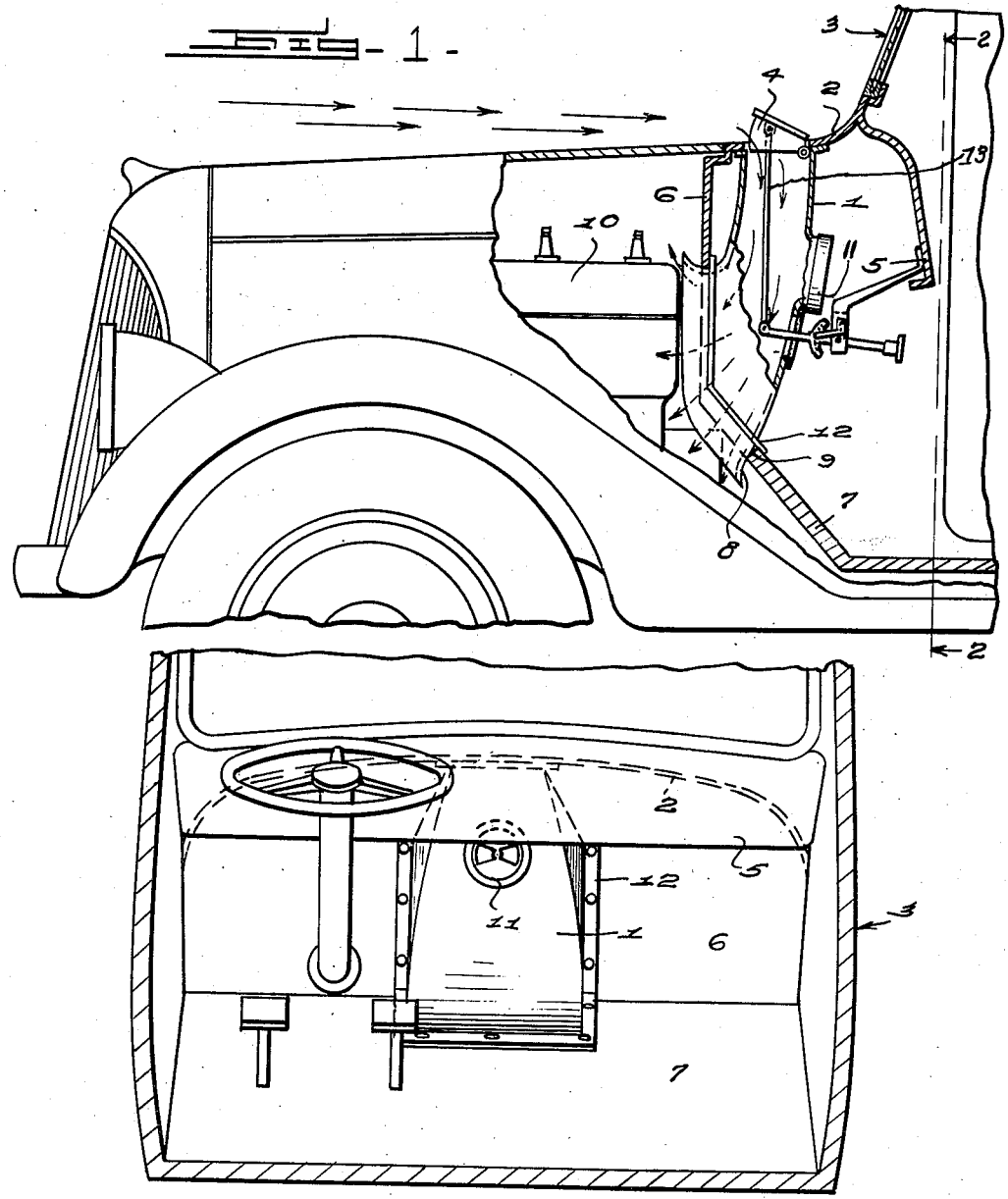
Fig. 1.
Fig. 2.
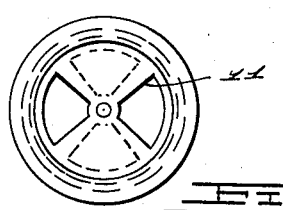
Fig. 3.
Inventor
GEORGE D. STEWART,
By Clarence A. O'Brien
and Hyman Berman
Attorneys Patented June 25, 1940

2,205,605

UNITED STATES PATENT OFFICE 2,205,605

ENGINE COOLING DEVICE

George Daniel Stewart, Atlanta, Ga.

Application November 20, 1939, Serial No. 305,370

1 Claim. (Cl. 180—54)

The present invention relates to new and useful improvements in cooling devices for the internal combustion engines of automobiles and has for its primary object to provide, in a manner as hereinafter set forth, novel means for directing air on the rear end of the vehicle engine for cooling same, thereby materially increasing the efficiency and prolonging the life of said engine.

Another very important object of the invention is to provide an engine cooling device of the aforementioned character wherein the intake of air from the atmosphere may be conveniently controlled from the operator's seat of the vehicle.

Still another very important object of the invention is to provide a device of the aforementioned character which is adapted to function as a heater for the interior of the vehicle.

Other objects of the invention are to provide an engine cooling device of the character described which will be simple in construction, strong, durable, highly efficient and reliable in use, compact, inconspicuous and which may be manufactured and installed at low cost.

All of the foregoing and still further objects and advantages of the invention will become apparent from a study of the following specification, taken in connection with the accompanying drawing wherein like characters of reference designate corresponding parts throughout the several views, and wherein:

Figure 1 is a view in vertical section through an engine cooling device constructed in accordance with the present invention, showing said device installed in an automobile.

Figure 2 is a cross sectional view, taken substantially on the line 2—2 of Fig. 1.

Figure 3 is an elevational view of the car heater control.

Referring now to the drawing in detail, it will be seen that the embodiment of the invention which has been illustrated comprises an air conduit 1 of suitable material having one end secured beneath the cowl 2 of the vehicle 3 in communication with the ventilator 4 in said cowl. It will be observed that the conduit 1 is located between the instrument panel 5 and the dashboard 6 of the automobile. Below the dashboard 6 is the usual toeboard 7 of the vehicle.

The conduit 1 has its lower portion enlarged and curved forwardly and terminates in a flared lower end portion 8 which projects through an opening 9 provided therefor in the dashboard 6 and the toeboard 7. The flared, forwardly directed lower end portion 8 of the conduit 1 extends closely adjacent the rear end of the engine 10 of the vehicle. Projecting rearwardly from the conduit 1 at an intermediate point is a manually controlled register or the like 11 for heating the interior of the vehicle. A flange 12 on the conduit 1 adjacent the flared end portion 8 thereof is secured to the dashboard 6 and the toeboard 7.

It is thought that the operation of the device will be readily apparent from a consideration of the foregoing. Briefly, when the vehicle is moving forwardly and the ventilator 4 is open, as seen in Fig. 1 of the drawing, air from the atmosphere enters the conduit 1 and flows downwardly therethrough. This air is directed forwardly against the rear end of the engine 10 by the curved lower portion of the conduit 1. Of course, this air is controlled and regulated by the ventilator 4. In addition to promoting the efficiency of the engine by keeping the rear end thereof comparatively cool, the use of the device will result in the transmission of less heat from beneath the hood to the interior of the body of the vehicle, thereby increasing comfort. Should it be desired to heat the interior of the vehicle, as in cold weather, the ventilator 4 is closed and the register 11 is opened. Any suitable means, as at 13, may be provided for opening and closing the ventilator 4. Warm air from adjacent the rear end of the engine 10 will then enter the conduit 1 and be discharged therefrom into the body of the vehicle through the register 11.

It is believed that the many advantages of an engine cooling device constructed in accordance with the present invention will be readily understood and although a preferred embodiment of said device is as illustrated and described, it is to be understood that changes in the details of construction and in the combination and arrangement of parts may be resorted to which will fall within the scope of the invention as claimed.

What is claimed is:

In combination, a motor vehicle comprising a body including a dashboard having an opening therein, an engine forwardly of the dashboard in alignment with the opening, the body further including a cowl rearwardly of the dashboard having a closure controlled opening therein, an air conduit mounted beneath the cowl and having one end secured thereto in communication with the opening therein, said conduit extending through the opening in the dashboard and terminating in a flared outlet end portion closely adjacent the rear end of the engine for discharging air thereagainst for cooling said engine, and means at an intermediate point on the conduit for discharging a portion of the air into the body of the vehicle.

GEORGE DANIEL STEWART.